United States Patent [19]   [11] Patent Number: 4,531,348
De Vilder et al.                  [45] Date of Patent:    Jul. 30, 1985

[54] TENSIONING DEVICE FOR POWER TRANSFER ASSEMBLY

[75] Inventors: Rudy J. C. De Vilder, Loppem, Belgium; José G. T. Gryspeerdt, New Holland, Pa.

[73] Assignee: Sperry Corporation, New Holland, Pa.

[21] Appl. No.: 612,512

[22] Filed: May 21, 1984

[30] Foreign Application Priority Data

May 27, 1983 [EP] European Pat. Off. ........ 83200754.6

[51] Int. Cl.³ ............................................ A01D 69/00
[52] U.S. Cl. ...................................... 56/11.6; 56/10.2; 474/101; 130/27 AA
[58] Field of Search ...................... 56/10.3, 10.2, 11.6; 474/101, 109, 118; 130/27 AA, 27 R

[56] References Cited

U.S. PATENT DOCUMENTS

| 4,306,403 | 12/1981 | Hubbard et al. | 56/10.3 |
| 4,321,991 | 3/1982 | Teijido et al. | 56/10.3 |
| 4,400,930 | 8/1983 | Huhman et al. | 56/10.3 |

FOREIGN PATENT DOCUMENTS

| 241675 | 12/1962 | Australia | 474/109 |
| 3207082 | 9/1983 | Fed. Rep. of Germany | 56/11.6 |
| 998168 | 7/1965 | United Kingdom | 474/109 |
| 228450 | 5/1969 | U.S.S.R. | 474/109 |

Primary Examiner—Gene Mancene
Assistant Examiner—John G. Weiss
Attorney, Agent, or Firm—Larry W. Miller; Frank A. Seemar; Darrell Marquette

[57] ABSTRACT

A belt-type power transfer assembly for driving the separating mechanism of a rotary combine harvester is disclosed wherein the assembly includes spaced apart driving and driven pulleys, an endless flexible belt interengaged between the pulleys to transfer rotational power therebetween and spring-loaded tensioning means operably engaged with the flexible belt to take up the slack thereof and to maintain proper tension therein when transferring rotational power. Stop means are associated with the spring-loaded tensioning means for restricting biasing movement thereof in the direction of the flexible belt, causing the tensioning means to act as fixedly positioned tensioning means after an initial belt tensioning movement thereof. The power transfer assembly according to the invention may be used to drive the separating mechanism of a rotary combine harvester.

7 Claims, 5 Drawing Figures

TENSIONING DEVICE FOR POWER TRANSFER ASSEMBLY

BACKGROUND OF THE INVENTION

The present invention relates to belt-type power transfer assemblies and has particular reference to such power transfer assemblies having belt tensioning devices and to the use of such power transfer assemblies on rotary type combine harvesters.

In known combine harvesters, crop material is threshed and separated in a threshing and separating mechanism and the separated grain, together with impurities is fed to a cleaning mechanism for cleaning. In conventional combine harvesters final grain separation is accomplished by straw walkers. In rotary combine harvesters the crop material is subjected to a much more aggressive and positive separating action during a relatively prolonged period of time, whereby the efficiency of a rotary combine harvester usually is greater than that of a conventional machine.

In one type of rotary combine harvester a conventional transversely extending threshing mechanism having a threshing cylinder and a cooperable concave is combined with a rotary separating mechanism having a rotor of a width greater than that of the threshing mechanism and disposed parallel thereto with its ends extending transversely past the respective ends of the threshing mechanism. The rotary separating mechanism operates spirally to convey the crop material received from the threshing mechanism towards each of its ends, while submitting the crop to a separating action.

It has been experienced that in rotary combine harvesters of the type described, irregular feeding of crop material to the separating mechanism may cause plugging which eventually may result in a so-called "kill-stop" of said mechanism. Provided the drive train to the separating mechanism does not comprise other safety devices, such a "kill-stop" often would result in a major breakdown, such as the drive belt and/or pulleys breaking and/or shafts bending.

spring-loaded tensioning devices for belt-type power transfer assemblies maintain belt tension to provide a positive drive under a wide range of load conditions, including the aforesaid "kill-stop" conditions; however, such tensioning devices improve the operative life of the belt. On the other hand, fixedly positioned belt tensioning devices will not provide a positive drive under "kill-stop" conditions, but do significantly shorten belt life.

SUMMARY OF THE INVENTION

It is an object of the present invention to overcome the aforementioned disadvantages of the prior art. More particularly, it is an object of the invention to combine in a belt-type power transfer assembly the advantages of spring-loaded and fixedly positioned belt tensioning devices, while eliminating the respective disadvantages thereof. In other words, the invention provides a belt-type power transfer assembly comprising a spring-loaded belt tensioning device which guarantees not only a longer belt life and a positive drive under normal load conditions, but also a substantial belt slip as a safety precaution under excessive load conditions so that extra safety devices are no longer needed to cope with such excessive load conditions.

It is a further object of this invention to apply such an improved power transfer assembly on a rotary combine for driving the rotary separating mechanism thereof.

According to the invention, a belt-type power transfer assembly comprises driving and driven pulleys, an endless flexible belt interengaged between said driving and driven pulleys to transfer rotational power therebetween, spring-loaded tensioning means operably engaged with the flexible belt to take up the slack thereof and to maintain proper tension therein when transferring rotational power and stop means associated with the spring-loaded tensioning means for restricting movement thereof in the direction of the flexible belt.

Preferably, the spring-loaded tensioning means comprise a tension pulley rotatably mounted on a pivot arm and biasing means acting between a fixed support on the machine chassis and the pivot arm to urge the latter with the tension pulley thereon in the direction of the flexible belt. The stop means are associated with the biasing means and restrict biasing movement thereof. The biasing means may comprise a rod pivotally coupled at one end to the pivot arm and supporting at a distance therefrom abutting means. A compression spring may be provided in the pre-compressed condition between the abutting means on the rod and the fixed support on the machine chassis. The stop means may be associated with the compression spring for restricting extension thereof.

The stop means preferably are in the form of a generally U-shaped bracket, one leg of the U-shape being held in fixed position relative to one end of the compression spring and the other leg of the U-shape being positioned in the vicinity of the other end of the compression spring for engagement, upon extension of the compression spring, with the fixed support, respectively the abutting means on the rod at the side thereof facing away from said compression spring for restricting extension of said compression spring.

According to a further aspect of the invention, the belt-type power transfer assembly identified above is applied on a combine harvester comprising a threshing mechanism and a rotary separating mechanism for driving said separating mechanism.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
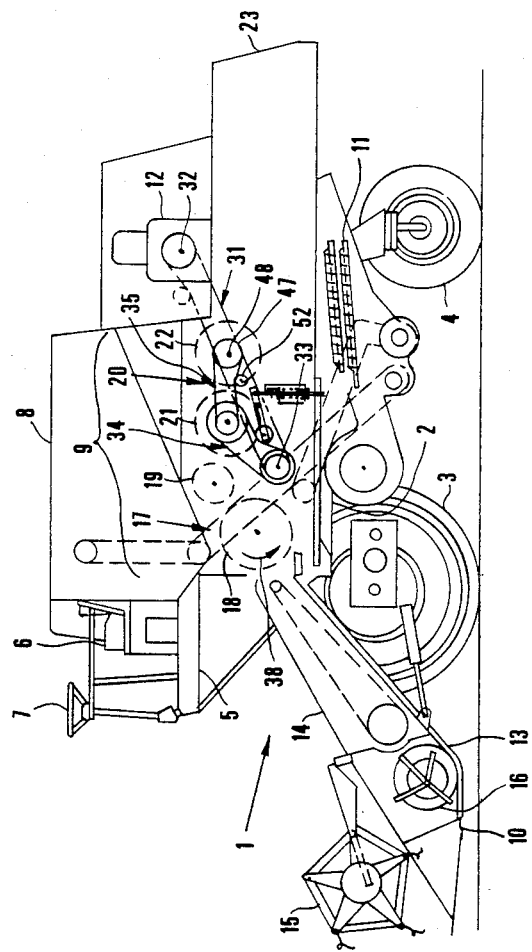
FIG. 1 is a diagrammatic side elevational view of a combine harvester, incorporating the principles of the instant invention.

With reference to the drawings, particularly FIG. 1, a side elevational view of a harvester incorporating the principles of the instant invention can be seen. Any left and right references are used as a matter of convenience and are determined by standing at the rear of the machine, facing the forward end, the direction of travel. The combine, generally indicated at 1, comprises a main chassis or frame 2 supported on a front pair of drive wheels 3 and a rear pair of steerable wheels 4. Supported on the main chassis 2 are an operator's platform 5 with a driver's seat 6 and a steering wheel 7, a grain tank 8, a threshing and separating mechanism indicated generally at 9, a grain cleaning mechanism 11 and an engine 12. A conventional header 13 and straw elevator 14 extend forwardly of the main chassis 2.

As the combine harvester 1 is propelled forwardly over a field with standing crop, the latter is severed from the stubble by a sickle bar 10 on the header 12, whereafter a reel 15 and a header auger 16 convey the cut crop to the straw elevator 14 which supplies it to the threshing and separating mechanism 9. The crop received within the threshing and separating mechanism 9 is threshed and repeated; that is to say the crop is rubbed and beaten, whereby the grain, seed or the like, is loosened and separated from the straw, stalks, coils or other discardable part of the crop.

Grain which has been separated from the straw falls onto the grain cleaning mechanism 11 which comprised means to separate chaff and other impurities from the grain and means to separate unthreshed materials (tailings). Clean grain is then elevated into the grain tank 8 and the tailings are reprocessed in separate tailings rethreshers (not shown) and returned to the cleaning mechanism 11 for repeat cleaning action.

A threshing portion 17 of the threshing and separating mechanism 9 comprises a rotatable threshing cylinder 18 cooperable with a stationary threshing concave (not shown). Rearwardly of the threshing mechanism 17, a deflector beater, or so-called straw beater 19 with an associated beater grate (again not shown) is provided.

A separating portion 20 of the threshing and separating mechanism 9 comprises a first separator rotor or cylinder 21 and a second rotor or cylinder 22 cooperable with respective concaves (also not shown). The second rotor 22 is mounted within a separating housing (not shown) and both of these components have a width substantially exceeding the width of the first rotor 21 which, like the straw beater 19, has the same width as the threshing mechanism 17.

Drive means are provided for driving the threshing cylinder 18, the straw beater 19, the first separating rotor 21 and the second separating rotor 22 in the counter clockwise direction 38 as viewed in FIG. 1. The drive means to the threshing cylinder 18 and straw beater 19 are conventional and are therefore not shown in the drawings. The power transfer assembly to the separating rotors 21 and 22 basically comprises a first belt transmission 31 between the engine shaft 32 and an intermediate shaft 33, a second belt transmission 34 between said intermediate shaft 33 and the first separating rotor 21 and finally a third belt transmission 35 between the first and second separating rotors 21 and 22. The invention is concerned with the second belt transmission 34 and will be described in greater detail below.

A conventional rpm monitor (not shown) may be associated with, for example, the shaft of the second separating rotor 22 for warning the operator when the speed thereof drops below a nominal value and so that the operator can take appropriate corrective action.

In operation, the mat of crop material issuing from the threshing mechanism is deflected by the straw beater 19 to the separating mechanism 20 where it is first conveyed in a generally rearward direction between the first separating rotor 21 and the associated concave and then received by the second separating rotor 22, where it is divided into two portions (by means not shown). The resulting two portions are moved spirally around the rotor 22 to respective ends thereof to complete the separating action. On reaching the ends of the rotor 22, the mats of crop material (straw) are propelled by the rotor through respective discharge channels and the straw hood 23 for discharge from the machine.

The threshing and separating components of the combine harvester so far described are disclosed in greater detail in British Specification No. 2,063,039, the contents of which are incorporated herein by reference.

Figure 2:
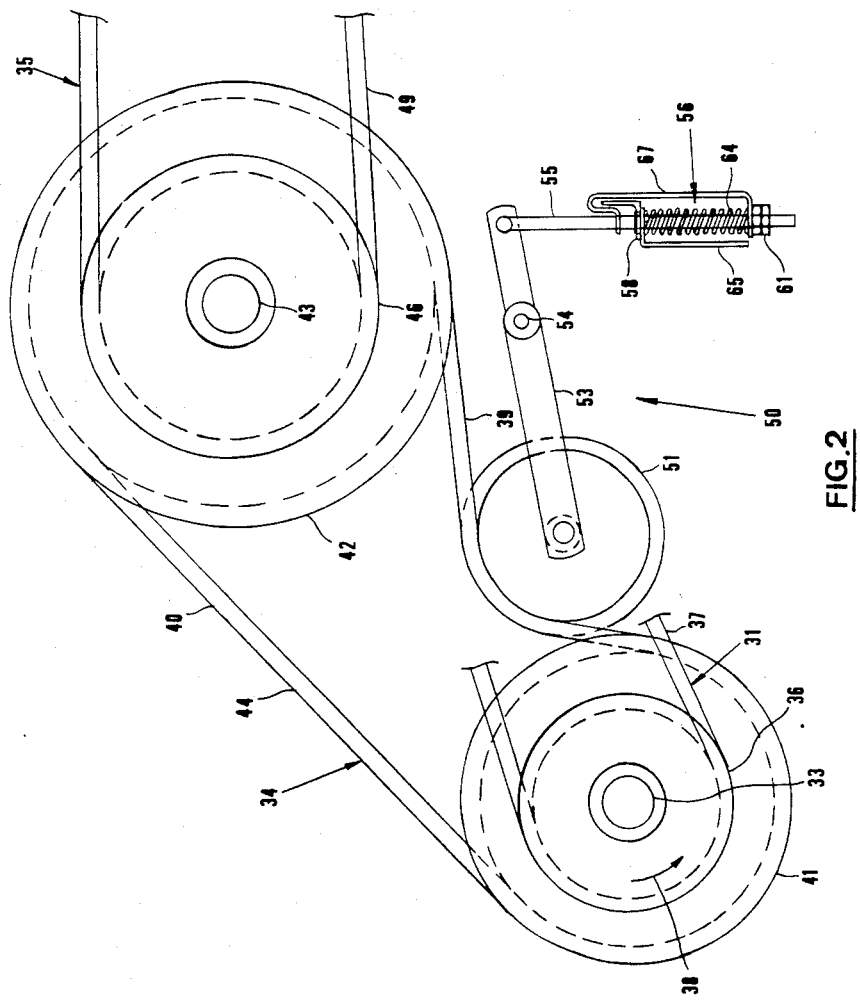
FIG. 2 is an enlarged partial side elevational view of the belt-type power transfer assembly seen in FIG. 1, showing the instant invention in greater detail.
Figure 3:
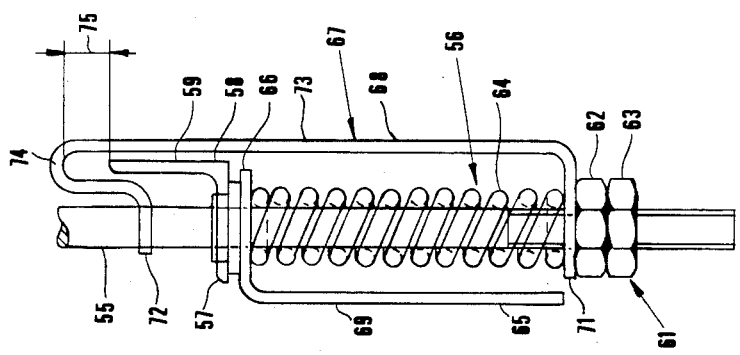
FIG. 3 is an enlarged detail view of the tensioning mechanism incorporating a stop means, as seen in FIG. 2.

With reference to FIGS. 2 and 3, the power transfer assembly according to the invention and for the separating mechanism 20 will be seen in greater detail. The intermediate shaft 33 is provided with a V-pulley 36 for receiving V-belt 37 of the first belt transmission 31 and which drives the intermediate shaft 33 in the direction as shown at 38 in FIG. 2. The second belt transmission 34 comprises a first V-pulley 41 on the intermediate shaft 33, a further V-pulley 42 on the shaft 43 of the first separating rotor 21 and a V-belt 44 interengaged therebetween for transferring rotational power from the intermediate shaft 33 to the separating mechanism 20 in general and to the first separating rotor 21 in particular.

The third belt transmission 35 comprises again a first V-pulley 46 on the shaft 43 of the first separating rotor 21, a further V-pulley 47 on the shaft 48 of the second rotor 22 and a V-belt 49 interengaged therebetween. spring-loaded tension pulleys 51,52 operably engage with the so-called slack portions of the respective V-belts 44 and 49 to take up the slack thereof and to maintain proper tension therein when transferring rotational power.

The tension pulley 51, which is part of the belt tensioning device 50, is rotatably supported on one end of a pivot arm 53 which is pivotally mounted at 54 on the combine chassis 2. The pivot arm 53 is pivotaly coupled at its other end to a tension rod 55 of a biasing means generally indicated at 56. The tension rod 55 extends through an aperture in one leg 57 of a fixed and generally L-shaped support 58 on the chassis. An adjustable stop 61 in the form of an abutment nut 62 and an associated lock nut 63 is provided adjacent the threaded free end of the tension rod 55. A compression spring 64 extends coaxially with the tension rod 55 between the fixed support 58 and the adjustable stop 61. The compression spring is dimensioned and pre-compressed to urge the tension pulley 51 with a pre-determined force against the slack portion 39 of the belt 44. To facilitate adjustment of the degree of pre-compression of the spring 64, a so-called spring indicator 65 is provided. As is conventional, the spring indicator 65 is generally L-shaped and is positioned with its shorter leg 66 in engagement with the support 58 on the chassis 2. The longer leg 69 has a length corresponding to the length of the compression spring 64 when compressed to the degree as desired. Thus, to pre-compress the spring to the pre-determined amount, it is sufficient to adjust the stop 61 on the tension rod 55 until its surface abutting the compression spring 64 is aligned with the free end of the longer leg 69 of the spring indicator 65. Such adjustment is done when the drive is interrupted. As the belt 44 stretches during its lifetime readjustment is necessary from time to time.

According to the invention, stop means 67 are associated with the biasing means 56 for restricting the extension of the compression spring 64 as the drive belt 44 lengthens during operation and thus permits the compression spring 64 to urge the tension pulley 51 further in the direction of the drive belt 44 for taking up the increased slack therein.

The stop means 67 are in the form of a generally U-shaped bracket 68 having both legs 71,72 apertured for sliding over the tension rod 55. The bracket 68 is positioned with one leg 71 in engagement with the abutment nut 62 on the tension rod 55. The compression spring 64 may be arranged to urge said leg 71 in continuous contact with said abutment nut 62.

The bracket 68 further also comprises between the base portion 73 and the leg 72, a bent portion 74, which is hooked around the leg 59 of the support 58. When the compression spring 64 is pre-compressed to the predetermined amount and when the drive is disengaged, the hooked portion 74 is positioned at a short distance from the leg 59 of the support 58 thus providing therebetween a clearance 75, which typically may be in the range of 10 mm. However, this clearance is, of course, dependent upon, among other things, belt characteristics such as length and strength, maximum load to be transferred and the positioning of idler pulley relative to the driving and driven pulleys. As the compression spring 64 extends, the bent portion 74 approaches and eventually engages the support 58 whereafter further extension of the compression spring 64 is impossible. The hooked portion 74 overlying the leg 59 of the support 58 equally prevents angular displacement of the stop means 67 around the tension rod 55.

Prior to turning to the operation of the structure according to the invention, and for enabling a better understanding of the characteristics of the invention, some consideration will be made hereafter with respect to belt-type power transmission assemblies, in general, and with respect to such assemblies having either spring-loaded or fixedly positioned belt tensioning devices, in particular.

It is generally known in the art of belt-type power transfer assemblies that the so-called slack portion of the belt appears to lengthen when transferring power. This is partly due to actual stretching of mainly the so-called tight portion of the belt as a result of the tension therein while transmitting power. However this lengthening in part also may be fictive and result from the driving and driven shafts bending toward each other under load conditions, especially when the pulleys are provided at a substantial distance from the nearest bearing means supporting the shafts on the chassis. Further, the chassis may be caused to bend, whereby the bearing means, supporting the shafts, no longer extend perfectly parallel to each other and thus the spacing between driving and driven pulleys decreases.

For the sake of convenience, this apparent lengthening of a belt under load conditions and consisting of fictive stretching as a result of the aforementioned deformations, as well as of actual stretching, will be called herein dynamic belt stretch. This dynamic belt stretch increases with incresing power being transferred.

Of course belt tensioning devices are used in combination with these belt-type power transfer assemblies. These belt tensioning devices are either spring-loaded or fixedly positioned. spring-loaded belt tensioning devices are advantageous for several reasons. One such reason is the fact that they take up the dynamic belt stretch under loading conditions. Another such reason is the fact that spring-loaded belt tensioning devices provide a longer belt life as the nominal force with which tensioning devices are set to act on the slack portion of the belts may be kept lower than in case of fixedly positioned tensioning devices.

However, under certain conditions spring-loaded tensioning devices equally may have a disadvantage. If the belt of a belt-type power transmission could be arranged to slip to a substantial degree under excessive load and/or peak load conditions, such slip could reduce and/or eliminate the danger for breakdowns resulting therefrom and thus, in fact, act as a kind of safety slip clutch. Typically, a spring-loaded tensioning device prevents such substantial belt slip under the conditions described and thus the belt type power transmission assembly comprising a spring-loaded tensioning device cannot normally act as a safety device.

Of course prolonged belt slip would burn the belt and thus the safety characteristics aimed at and resulting from such belt slip are really useful only when this belt slip is, or otherwise can be kept very short in time.

Fixedly positioned belt tensioning devices do not take up the dynamic belt stretch in a belt-type power transfer assembly. As a result thereof, this type of belt tensioning devices must be set to exert a substantially larger initial force on the so-called slack portion of the belt (when no power is being transferred) to guarantee transmission of a nominal power. Hence, the belt in such a transmission assembly, is always highly tensioned, even when transmitting an actual power which is smaller than the nominal power for which the assembly is adjusted. This causes faster belt wear in comparison with an assembly having a spring-loaded belt tensioning device.

However, as the fixedly positioned tensioning device is unable to take up dynamic belt stretch, substantial belt slip will occur when the power being transferred exceeds the nominal power, for which the assembly is set, with a certain amount. Thus the belt assembly with fixedly positioned tensioning device acts as a kind of safety slip clutch protecting the assembly against excessive and/or extreme peak loads.

It has been experienced that, in rotary combine harvesters of the type described, irregular feeding of crop material to the separating mechanism may cause plugging, which eventually may result in a so-called "kill-stop" of said mechanism. In case the separating mechanism would be belt driven with a drive assembly comprising a conventional spring-loaded tensioning device, and provided the drive train does not comprise other safety devices, such a "kill-stop" often would result in a major break-down such as the belt and/or pulleys breaking and/or shafts bending. Under these circumstances, the rpm monitor associated with the separator mechanism is often unable to produce a timely warning to the operator, as a "kill-stop" may occur very suddenly.

Coming back to the structure according to the invention, it will be appreciated that, prior to starting operation of the combine harvester 1, the belt tensioning device 50 of the power transfer assembly 34 for driving the separator mechanism 20 is set for a nominal power transmission as is required for driving the separator mechanism 20 under normal load conditions. This means that, prior to starting the drive, the compression spring 64 is pre-compressed to a pre-set amount by adjusting the stop means 61 on the tension rod 55 until the length of the spring 64 corresponds to the length of the longer leg 69 of the spring indicator 65. In this condition, the tension pulley 51 is pressed with a pre-determined and rather reduced force against the slack portion 39 of the belt 44, thus taking up the slack thereof. Under these conditions, the hooked portion 74 of the stop means 67 is at a clearance 75 from the leg 59 of the support 58 on the chassis 2.

When driven and transferring power to the separating mechanism 20, dynamic stretch occurs in the drive belt 44. This dynamic stretch is taken up by the spring-loaded tensioning device 50 as the compression spring estends to a certain amount for urging the tension pulley 51 further in the direction of the slack portion 39 of the belt 44. The clearance 75 is thereby reduced but not yet eliminated, provided the load is not excessive. Thus the tensioning device 50 continues to operate as a spring-loaded tensioning device and thus has the advantages of conventional belt tensioning devices as described above.

However, an excessively large lump or an excessively thick layer of crop material fed to the separating mechanism 20, produces a peak load respectively a continuously high load. In both cases these loads substantially exceed the nominal load for which the drive assembly is set. This results in additional dynamic belt stretch and thus permits the compression spring 64 to extend further for urging the tension pulley 51 even further in the direction of the slack portion 39 of the belt 44 and until the hooked portion 74 of the stop means 67 engages the support 58. From that moment onwards, the tensioning device 50 according to the invention acts as a fixedly positioned tensioning device and thus, further dynamic belt stretch soon results in substantial belt slip, which provides protection against damage which otherwise might be caused.

This belt slip also results in the rpm of the separating rotors 21,22 dropping substantially and eventually becoming zero. The rpm monitor associated with the separating mechanism 20 immediately triggers an alarm, whereby the operator is warned to immediately stop operation and interrupt the drive, thus avoiding not only the type of damage already described, but also avoiding burning of the drive belt.

It thus will be appreciated that the structure according to the invention combines the advantages of a belt-type power transfer assembly having a spring-loaded tensioning device and a belt-type power transfer assembly having a fixedly positioned tensioning device while eliminating the disadvantages of these respective assemblies. Indeed, a longer belt life together with a reduced loading (bending) of the driving and driven shafts is obtained on the one hand as well as a protection against excessive loads and/or peak loads and against the threats of major breakdowns which may result therefrom on the other hand. This arrangement also eliminates the need for a separate safety clutch in the drive line to the separating mechanism of a rotary combine and thus, the cost of the combine is reduced accordingly.

Also, the stop means according to the above-described embodiment of the invention, do not require any special adjustment as indeed, the U-shaped bracket 67 is automatically correctly positioned as soon as the pre-compression of the spring 64 is accurately adjusted by means of the nuts 62,63 and with reference to the spring indicator 65. Such adjustment of the pre-compression of the spring 64 is necessary from time to time to take into account the permanent belt stretch (other than the dynamic belt stretch defined above) resulting from belt wear.

Figure 4:
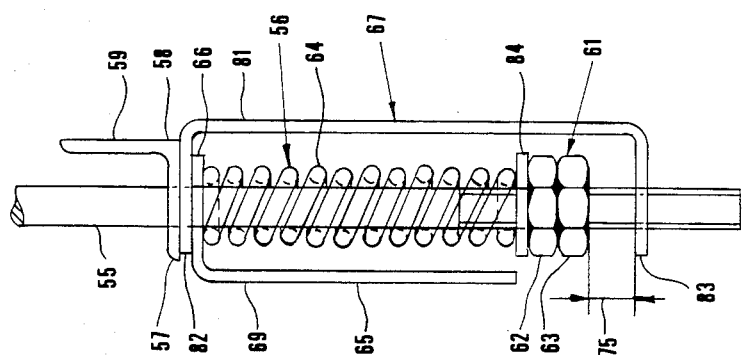

It will be understood that various changes in the details may be made to the arrangement as described with reference to the FIGS. 2, 3 and without departing from the scope of the invention. One such change is shown in FIG. 4. Components in the arrangement according to FIG. 4 which are identical to corresponding components in the arrangement according to FIGS. 2, 3, have been indicated by the same reference numerals.

The U-shaped bracket 68, which is in the arrangement according to FIGS. 2, 3 is movable in unison with the tension rod 55 for abutting against the support 58, has been replaced by a fixedly positioned U-shaped bracket 81. This bracket 81 again has two apertured legs 82,83 for positioning the same on the tension rod 55. A first leg 82 is disposed to seat together with the shorter leg 66 of the spring indicator 65 against the fixed support 58 on the chassis 2 and to be held thereagainst by the compression spring 64. Said spring 64 engages at its other end a washer 84 abutting against the abutment nut 62 of the stop 61 on the tension rod 55. The other leg 83 of the bracket 81 is positioned in the no-load condition at a distance 75 from the lock nut 63.

Extension of the compression spring 64 causing the tnesion pulley 51 to take up dynamic stretch, also causes the tension rod 55 and the stop 61 thereon to move relative to the fixed support 58 and to the now stationary second leg 83 of the U-shaped bracket 81. Such relative movement is limited by the lock nut 62 engaging said second leg 83 whereafter the tensioning device, using the components shown in FIG. 4, operates as if it were a fixedly positioned tensioning device.

Figure 5:
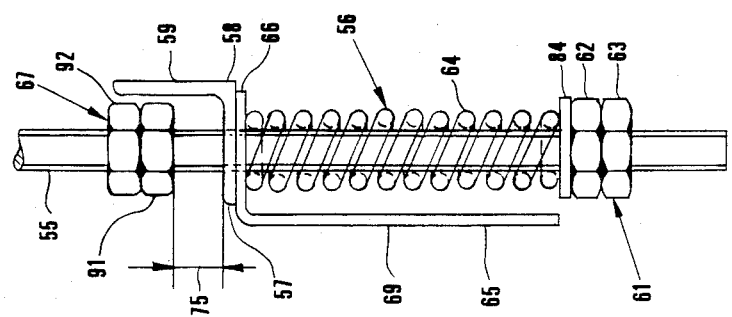
FIGS. 4 and 5 are views similar to that of FIG. 3, but showing alternative embodiments of the invention.

In the arrangement shown in FIG. 5, the stop means in the form of a U-shaped bracket, have been replaced by other stop means, which, this time are in the form of a simple abutment nut 91 and an associated lock nut 92 provided on the tension rod 55 in the vicinity of the fixed support 58 and at the side thereof opposite to the side facing the compression spring 64. The abutment nut 91 is positioned, in the no-load condition, at a distance 75 from the fixed support 58. When excessive load is applied to the power transfer assembly, the extension of the compression spring 64 causes the abutment nut 91 to engage the support 58, whereafter again the tensioning device using the components of FIG. 5, operates as if it were a fixedly positioned tensioning device. It will be understood however that, contrary to the arrangements according to FIGS. 2, 3 and 4, the arrangement according to FIG. 5 requires additional adjustment of the stop means 61 any time the pre-compression of the compression spring 64 is readjusted.

Clearly, other amendments to arrangements already shown and described are still possible. According to one such further amendment, the leg 72 and the hooked portion 74 of the U-shaped bracket 67 according to FIG. 3 may be replaced by a generally elongate aperture in the base portion 73 of the stop means 67 and generally in the vicinity of the fixed support 58 on the one hand and by a finger fixedly coupled to said support 58 and extending within said elongate aperture on the other hand.

It will be understood that changes in the details, material, steps and arrangment of parts which have been described and illustrated to explain the nature of the invention will occur to and may be made by those skilled in the art upon a reading of this disclosure within the principles and scope of this invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. A belt-type power transfer assembly having spaced apart driving and driven pulleys, endless flexible belt means interengaged between said driving and driven pulleys to transfer rotational power therebetween, and spring-loaded tensioning means operably engaged with the flexible belt means to take up the slack thereof and to maintain proper tension therein when transferring rotational power between said driving and driven pulleys, said spring-loaded tensioning means including a tension pulley rotatably mounted on a pivot arm and biasing means acting between a fixed support and the pivot arm to urge the latter with the tension pulley thereon in the direction of the flexible belt means, said biasing means including a tension rod pivotally coupled at one end to the pivot arm, the tension rod supporting at a distance therefrom abutting means, and a compression spring provided in the precompressed condition between the abutting means and the fixed support, the improvement comprising:

stop means associated with the biasing means compression spring in said spring-loaded tensioning means for restricting the extension of said compression spring to limit the biasing movement thereof in tensioning the flexible belt means when the slack therein reaches a predetermined amount.

2. The power transfer assembly of claim 1 wherein the abutting means are adjustably positioned along the length of the tension rod for enabling adjustment of the initial spring tension.

3. The power transfer assembly of claim 2 wherein the stop means are in the form of a further abutment member provided on the tension rod at the side of the fixed support opposite to the side thereof facing the compression spring and disposed to engage the fixed support upon extension of the compression spring for restricting said extension.

4. The power transfer assembly of claim 3 wherein the further abutment member is adjustably mounted on the tension rod.

5. The power transfer assembly of claim 2 wherein the stop means are in the form of a generally U-shaped bracket, one leg of the U-shaped bracket being positioned in the vicinity of the other end of the compression spring for engagement, upon extension of the compression spring with the fixed support, respectively the first abutting means on the tension rod at the side thereof facing away from said compression spring for restricting said extension.

6. The power transfer assembly of claim 5 wherein the one leg of the U-shaped bracket is held in engagement with the first abutment means on the tension rod and the other leg of the U-shaped bracket is positioned for engagement, upon extension of the compression spring with the fixed support at the side thereof opposite to the side facing the compression spring, thus restricting said extension.

7. The power transfer assembly of claim 6 wherein the fixed support is generally L-shaped in cross section, the bracket further includes a bent portion which is hooked around one leg of said support for preventing angular displacement of said bracket around said tension rod.

* * * * *